US010243802B2

(12) United States Patent
Erdmann et al.

(10) Patent No.: US 10,243,802 B2
(45) Date of Patent: Mar. 26, 2019

(54) METHOD FOR CONFIGURING A NODE AND A NODE CONFIGURED THEREFORE

(71) Applicant: PHILIPS LIGHTING HOLDING B.V., Eindhoven (NL)

(72) Inventors: Bozena Erdmann, Aachen (DE); Teresa Zotti, Aachen (DE); Robert Cornelis Houtepen, Breda (NL); Philip Anthony Jamieson, Horley (GB)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 300 days.

(21) Appl. No.: 14/899,164

(22) PCT Filed: Jun. 17, 2014

(86) PCT No.: PCT/EP2014/062775
§ 371 (c)(1),
(2) Date: Dec. 17, 2015

(87) PCT Pub. No.: WO2014/202639
PCT Pub. Date: Dec. 24, 2014

(65) Prior Publication Data
US 2016/0142263 A1 May 19, 2016

(30) Foreign Application Priority Data

Jun. 17, 2013 (EP) .................................... 13172275
Sep. 18, 2013 (EP) .................................... 13185046

(51) Int. Cl.
*H04L 12/24* (2006.01)
*H04W 4/80* (2018.01)
(Continued)

(52) U.S. Cl.
CPC ............... *H04L 41/12* (2013.01); *H04W 4/80* (2018.02); *H04W 8/005* (2013.01); *H04W 48/16* (2013.01); *H04W 84/18* (2013.01)

(58) Field of Classification Search
None
See application file for complete search history.

(56) References Cited

U.S. PATENT DOCUMENTS 7,995,994 B2 * 8/2011 Khetawat ................ H04M 3/16
455/410
8,059,560 B2 * 11/2011 Ushiyama ........... H04L 12/1854
370/254

(Continued)

FOREIGN PATENT DOCUMENTS

CN 102273311 A 12/2011
JP 2010093743 A 4/2010

(Continued)

OTHER PUBLICATIONS

Su Dong-Feng, et al., Research of New Wireless Sensor Network Protocol: Zigbee RF4CE, IEEE 2010 (4 Pages).

(Continued)

*Primary Examiner* — Tuan A Tran
(74) *Attorney, Agent, or Firm* — Meenakshy Chakravorty

(57) ABSTRACT

The invention relates a wireless node and to a method for operating the wireless node, wherein the wireless node comprises a controller arranged for communicating wirelessly with at least one further wireless node so as to determine an ability of the wireless node and to create a network, wherein a characteristic of the network depends on the determined ability of the wireless node.

15 Claims, 6 Drawing Sheets

(51) Int. Cl.
*H04W 8/00* (2009.01)
*H04W 48/16* (2009.01)
*H04W 84/18* (2009.01)

(56) References Cited

U.S. PATENT DOCUMENTS

| | | | |
|---|---|---|---|
| 8,441,959 B2 * | 5/2013 | Erdmann | H04W 84/18 |
| | | | 370/254 |
| 8,811,225 B2 * | 8/2014 | McCormack | H04W 8/005 |
| | | | 370/254 |
| 9,077,640 B2 * | 7/2015 | So | H04L 47/122 |
| 9,112,950 B2 * | 8/2015 | Cheung | H04L 12/4604 |
| 9,705,704 B2 * | 7/2017 | So | H04L 12/4641 |
| 2003/0126284 A1 * | 7/2003 | Houston | H04L 12/4633 |
| | | | 709/238 |
| 2005/0174950 A1 * | 8/2005 | Ayyagari | H04L 41/12 |
| | | | 370/254 |
| 2010/0177660 A1 | 7/2010 | Essinger et al. | |
| 2011/0149803 A1 | 6/2011 | McCormack et al. | |

FOREIGN PATENT DOCUMENTS

| | | |
|---|---|---|
| JP | 2011114377 A | 6/2011 |
| RU | 2008139287 A | 4/2010 |
| WO | 2006011077 A1 | 2/2006 |
| WO | 2009147584 A1 | 12/2009 |
| WO | 2010023619 A1 | 3/2010 |

OTHER PUBLICATIONS

Wangqun Jie, et al., "Development of a Zigbee-Based Wireless Sensor Network System," IEEE 2012 (5 Pages).

Baronti, Paolo, "Wireless Sensor Networks: A Survey on the State of the Art and the 802.15.4 and Zigbee Standards," Science Direct, Computer Communications, 30 (2007) 41 Pages.

* cited by examiner

METHOD FOR CONFIGURING A NODE AND A NODE CONFIGURED THEREFORE

CROSS-REFERENCE TO PRIOR APPLICATIONS

This application is the U.S. National Phase application under 35 U.S.C. § 371 of International Application No. PCT/EP2014/062775, filed on Jun. 17, 2014, which claims the benefit of European Patent Application No. 13172275.3, filed on Jun. 17, 2013 and European Patent Application No. 13185046.3, filed on Sep. 18, 2013. These applications are hereby incorporated by reference herein.

FIELD OF THE INVENTION

The present invention relates to the field of a method of commissioning a node and creating a network, and to such nodes. This invention is, for example, relevant for wireless sensor networks, and in particular to home automation networks where a plurality of different protocols exist.

BACKGROUND OF THE INVENTION

Home automation makes use of wireless networks. Over the past years, numerous types of networks have been proposed and are being used. As an example, ZigBee is a low-cost, low-power, wireless mesh network standard. The low cost allows the technology to be widely deployed in wireless control and monitoring applications. Low power usage allows longer life with smaller batteries. ZigBee is based on an IEEE 802.15.4 standard. Though low-powered, ZigBee devices often transmit data over longer distances by passing data through intermediate devices to reach more distant ones, creating a mesh network; i.e., a network with no high-power transmitter/receiver able to reach all of the networked devices. The decentralized nature of such wireless ad hoc networks makes them suitable for applications where a central node can't be relied upon.

In order for applications to communicate, their comprising devices must use a common application protocol (types of messages, formats etc.). These sets of conventions are grouped in so-called profiles. Furthermore, binding is decided upon by matching input and output cluster identifiers, unique within the context of a given profile and associated to an incoming or outgoing data flow in a device. Binding tables contain source and destination pairs. ZigBee is available as two feature sets, ZigBee PRO and ZigBee and they define how ZigBee mesh networks operate. ZigBee PRO, the most widely used specification, is optimized for low power consumption and to support large networks with thousands of devices. ZigBee PRO proposes several profiles that could coexist in the same area. However, at the moment, there are some incompatibilities which prevent nodes from different profiles to form a single network.

ZigBee Home Automation (ZHA) is an industry global standard helping to create smarter homes that enhance the comfort, convenience, security and energy management for the consumer. Furthermore, ZigBee Light Link (ZLL) gives the lighting industry a global standard for interoperable and very easy-to-use consumer lighting and control products. It allows consumers to gain wireless control over all their LED fixtures, light bulbs, via timers, remotes and switches. An emblematic case is represented by ZHA profile and ZLL profile devices. The main gap here is represented by the different nature of the profiles involved. Namely, ZHA is built around a central coordinator while ZLL devices can operate in a distributed network taking advantage of a Touchlink mechanism to add components and manage the lighting network.

The task of configuring devices and networks to achieve the needs of the specific installation is known as commissioning. In its broadest sense, commissioning encompasses a wide range of tasks, including a survey of the radio and physical environment, the placement of devices, configuration of parameters, application binding, optimization of network and device parameters, and testing and verification of correct operation. Often, non- and semi-technical issues need to be considered, including the skills and workflow practices of the installer, ease of identification and accessibility of devices, and interoperability and coexistence with other wireless or wired systems. While consideration for commissioning is often focused on the installer, the ability to easily configure and commission ZigBee systems during development and testing, as well as field trials, can also significantly speed up the development and product delivery to market. Moreover, ease of commissioning is also important for the do-it-yourself consumer market.

The commissioning process involves a number of steps, namely finding and joining or creating a network, establishing a security association, discovering device(s) and service(s), and establishing a control relationship (in ZigBee referred to as finding and binding).

Three different commissioning modes are typically discussed with in the ZigBee Alliance. First, A-mode (automatic mode) which involves automatic commissioning of devices. The A-mode generally allows for minimal (or no) human intervention. Second, E-mode (easy mode), which involves the use of buttons or other physical mechanisms on devices to direct devices during commissioning. The E-mode allows for simpler end-user or professional installer commissioning. It usually targets small installations (size: typical home). Third, S-mode (system mode), which involves the use of external tools and are typically used by expert installers. The S-mode represents the most complex form of commissioning and includes the highest level of human intervention. It usually targets larger installations such as commercial premises and high-end residential environments. Furthermore, the S-mode is a centralized commissioning which is a means for a (central) device to—perform or control or influence commissioning on/of other devices. This type of commissioning is also being referred to as Gateway-, or Tool-commissioning. The central device can be a gateway, a home controller or a commissioning tool that is typically connected to a graphical user interface. It is able to configure bindings and reporting on other devices in the network. In order to perform the centralized commissioning, the functions are not dependent on the device being the ZigBee Coordinator. In fact, it can be a ZigBee Router as well. The device in a ZHA network with this functionality is defined as Commissioning Director (CD).

Current specifications for ZHA profiles define two different main commissioning modes, namely EZ-mode commissioning (e.g. push button commissioning) and centralized commissioning (e.g., aka Gateway, Tool or S-mode Commissioning), wherein EZ-Mode and centralized commissioning are complementary and fully compatible.

FIGS. 1 and 2 show flow charts representing conventional ways of commissioning for a node. An EZ-mode commissioning, in particular, is characterized by a network steering procedure as shown in FIG. 1.

According to FIG. 1, EZ-mode network steering is invoked at step S101, e.g. by a user action. Then, at step S102 it is checked whether the node is connected to or operating in a network. If so, it is checked at step S103 whether a permit join method is enabled. This is indicated by a permit join flag used to determine whether devices are allowed to join the device. If permit join is enabled, a permit join broadcast subroutine is initiated at step S104, to instruct also other devices to allow joining. Thereafter, a permit join setting subroutine is initiated at step S105 which ends with a permit join timeout until the procedure ends at step S108. If it is determined at step S102 that the node is not connected to or operating in a network, a scan and join procedure is initiated and it is checked at step S106 whether the procedure was successful. If so, the procedure jumps to step S104 and the permit join procedure is initiated, to allow further devices to join, including at the newly added device. If failure of the scan and join procedure is determined at step S106, an optional network formation procedure is initiated and it is optionally checked at step S107 whether the network formation procedure was successful. If so, the procedure jumps to step S105 and the permit join setting subroutine is initiated, to allow further devices to join this newly formed network. If failure of the network formation procedure is determined at step S107, the procedure ends at step S108. It is a shortcoming of the current EZ-Mode procedure, not to indicate exactly under which conditions the network formation of step S107 may happen, and what exactly should be the result. This will lead to inconsistent behaviour in the network, and non-interoperability. Since the procedure is optional, it may—in certain scenarios—result in no network formation at all.

In the same vein, the ZLL profile specification (as disclosed in docs-zll-zigbee-light-link-zll-profile-specification, ZigBee document number 11-0037) provides as preferred commissioning mechanism a Touchlink commissioning. The ZLL system benefits from a simplified installation method in order to appeal to the consumer market. This method is known as Touchlink and minimizes user participation, allowing off-the-shelf products to be quickly and easily installed by the consumer. Touchlink removes the need for a ZigBee Coordinator in the network formation and join processes. The method uses a special commissioning application (based on a ZLL commissioning cluster) which is run on the nodes. The node that initiates the network formation/join operation is known as the 'initiator'—this node will often be a remote control unit but could be another node, e.g. a switch, a sensor or even a lamp. Touchlink simply requires the initiator node to be brought close to the node to be included in the network and the commissioning to be started (e.g. by pressing a button). The node that is contacted by the initiator to perform a network formation or join operation is known as the 'target'.

FIG. 2 shows a signalling diagram which summarizes steps performed in the Touchlink procedure by a ZLL initiator (ZLL-I) and a ZLL target (ZLL-T), as described in ZLL specification (ZigBee document 11-0037-10).

The procedure begins at step 201, upon an optional user intervention or other trigger. At step 202 the initiator broadcasts a scan request inter-PAN command frame on each of the primary ZLL channels (11, 15, 20, 25) and waits at step 202a a pre-determined time duration to receive any answer, before switching to the next channel. The initiator first five consecutive scan request inter-PAN command frames on the first primary ZLL channel (i.e., channel 11), and then broadcasts a single scan request inter-PAN command frame on each of the remaining primary ZLL channels in turn (i.e., channels 15, 20 and 25, respectively). After each transmission, the initiator shall wait aplcScanTimeBaseDuration seconds to receive any responses. On receipt of a scan request, the target device checks at step 203 if the RSSI of the received scan request is above a certain pre-defined threshold. If so, the target device unicasts a scan response at step 204.

The initiator may request information about the additional sub-devices of the target by unicasting a device information request at step 205. On receipt of this request, the target replies at step 206 with a device information response.

Optionally, e.g. to let the user select among multiple of devices found, the initiator may generate and transmit an identify request inter-PAN command frame to the target device at step 207, with the identify time field set to a pre-defined time duration. On receipt of an identify request the target identifies itself in an application specific way but does not generate any response. At step 208 the initiator may transmit to the target an identify request stop.

Further actions in the procedure depend on the check at step 209, in which it is verified whether the initiator is a factory new device.

If the initiator is factory new, at step 210, it sends to the selected target a network start request inter-PAN command frame and, at step 210a, it starts a reception window with a predetermined duration to allow the target device to send a response. On receipt of the network start request, the target decides at step 211 whether to allow itself to start a new network. If the target decides to start a new network, at step 212 it transmits back to the initiator a network start response inter-PAN command frame with a status indicating success. On receipt of a network start response within the time window, the initiator starts at step 213 a new time window, with a predetermined duration (aplcMinStartupDelayTime), to allow the target to create the new network. At step 214, is determined if the target is a factory new device. If not, at step 216 the target performs a leave request on its old network and copies the new network parameters to its network information base and starts operating on the new network. If the time window started at step 213 is elapsed, the initiator joins at step 215 the new network by means of a rejoining procedure.

If at step 209 is determined that the initiator is a non factory new device, the procedure continues at step 218 in which the initiator transmits a network join router request inter-PAN command frame or a network join end device request inter-PAN command frame, depending on the target's device type, to the target and, at step 218a, enables its receiver for a pre-determined time duration to wait the target response. If the target decides to join the network, at step 219, it transmits back to the initiator a network join router/ end device response inter-PAN command frame at step 220. At step 223, the initiator waits for a pre-determined time duration (e.g. aplcMinStartupDelayTime) to allow the target device to start operating in the new network correctly. At step 221, it is checked whether the target device is factory new. If the target device is not factory new, it performs, at step 222, a leave request on its old network and at step 224 joins the new network.

Furthermore, in order to allow ZLL devices to join a non-ZLL network, ZLL devices have also to support a Classical Commissioning procedure, complementary to the Touchlink modality.

Although these procedures are currently supported and shared among the devices belonging to the same public application profile, they do not provide a common set of mechanisms able to allow interoperability between devices of different profiles.

Furthermore, the step related to the creation of the network, in case of a factory new device, presents a relevant gap for both. The formation and joining defined in the ZigBee specification does not allow for communication of two devices not yet operational in the network. Therefore, the ZLL procedure relies on an initiator which guarantees network inception via inter-PAN based commands, while ZHA devices rely on the presence of a central coordinator, absent in the ZLL network topology. For these reasons, the current commissioning procedures are not applicable in any context in which a ZLL router is to be connected to a ZHA end device or a ZHA router is to be connected to a ZLL end device, especially in the absence or without the assistance of any other devices (for example: a ZHA switch aiming at controlling a ZLL light bulb, or a ZLL switch aiming at controlling a ZHA light bulb).

In particular, two main problems are the necessary presence of one and only one coordinator for creation of a network, which limits current commissioning mechanisms for ZHA devices, and the inability of ZLL router devices to originate a network without an initiator providing initial setting parameters (i.e. PAN ID, EPID, operational channel, network security key, network address etc.) via the Touchlink procedure.

SUMMARY OF THE INVENTION

It is an object of the present invention to provide a method and apparatus for operating a wireless node which is able to fill the gaps between the different profiles and thereby prevent a deadlock of the commissioning procedure.

It is another object of the invention to simplify the commissioning methods for wireless nodes by increasing their interoperability.

These objects are achieved by an apparatus as claimed in claim 1, by a method as claimed in claim 3, and by a computer program product as claimed in claim 15.

Accordingly, it is proposed to operate a wireless node by a controller for communicating wirelessly with at least one further wireless node, wherein an ability of the wireless node is made available or wherein at least one of a capability and a status of the wireless node is known to the controller and the controller is arranged to create a network, wherein a characteristic of the network depends on the determined capability or status of the wireless node. This proposed commissioning mechanism is intended to overcome the gaps of current ZigBee specifications that do not present a common commissioning procedure for devices belonging to different public ZigBee PRO profiles. In particular, the proposed mechanism solves a variety of use case scenarios not contemplated in current commissioning specifications (i.d. ZLL device to control a ZHA device, ZHA device to control a ZLL device, commissioning of ZLL devices out of proximity).

More specifically, the proposed commissioning mechanism focuses on the existing problem for the first commissioning step, i.e. network creation.

Thus, a node may be configured to create a network which will serve as an anchor for other nodes to start the network. In fact, there may be no external action or signaling that the node (e.g. coordinator) must do upon forming the network. So the action may be an internal action only, such as selecting the network parameters, setting and enabling them by a network formation request and receiving a successful confirmation. Thus the act of forming the network may be fully silent from an external point of view. However, the network-configured device is listening and ready to respond to join requests of other devices.

This permits to solve the initially described problem of "finding and creating a network". Indeed, a router device has the capability to create a temporary distributed network and may take the initiative to do so, without the necessary presence of an initiator or a coordinator.

The result is a flexible framework of commissioning procedures able to cover the use cases already analyzed in current specifications and more complex contexts in which the compatibility of distributed (ZLL) and centralized (ZHA) network is required.

According to a first aspect, the controller may be further adapted to determine whether the wireless node is configured to be capable of network formation, and to create a distributed network if the wireless node is determined to be configured as a router device.

According to a second aspect, the controller may be adapted to detect whether at least one further node of a specific kind is in the vicinity of the wireless node and to create a network if no further node of the specific kind is detected in the vicinity of the wireless node. In an example, the at least one further node of the specific kind may be a coordinator node or an initiator node. Thus, the kind of created network can be made dependent on the capability of other nodes in the vicinity of the wireless node.

According to a third aspect which can be combined with the above first aspect, a suitable network may be searched for, and the ability of the wireless node may be determined by the controller if no suitable network or only a predetermined type of network is found, wherein the suitable network or the network of a predetermined type of network is a network having at least one of the following characteristics: operational on one of the channels supported by a joining device, allowing for joining, capable of adding a particular type of device, supporting a particular network profile, representing a particular network type (e.g. centralized, distributed, temporary), or containing a particular device type. This provides the advantage that the proposed commissioning procedure is only started if only a specific type of network or no network is detected. In an exemplary implementation, if a device self-forms a temporary network, then when performing commissioning again, it may join another network, or if a touchlink is performed on a temporary network with more than one devices, a factory new initiator may be instructed to join the temporary network rather than form a new network. According to a fourth aspect which can be combined with the above first or second aspect, the characteristic of the created network may be such that the network is of a distributed topology if the controller determines that the wireless node has distributed network formation capability. Again, network creation is adapted to the capability of the wireless node.

According to a fifth aspect which can be combined with any of the above first to fourth aspects, the controller may be further adapted to determine whether the wireless node has network forming capabilities and of what kind, to detect whether at least one further node of a specific kind is in the vicinity of the wireless node and to create a distributed network if the wireless node is determined to be a router device and if no further node of the specific kind is detected in the vicinity of the wireless node or to create a centralized network if the wireless node is determined to have coordinator capabilities and if no further node of the specific kind is detected in the vicinity of the wireless node.

According to a sixth aspect which can be combined with any of the above first to fifth aspects, the controller may search for a suitable network, determine an ability of the wireless node, and create a network depending on the determined ability of the wireless node, wherein the suitable network is a network having at least one of the following characteristics: operational on one of the channels supported by a joining device, allowing for joining, capable of adding a particular type of device, supporting a particular network profile, representing a particular network type (e.g. centralized, distributed, temporary), or containing a particular device type. The initial searching step ensures that it is first checked whether a network is already available.

According to a seventh aspect which can be combined with any of the above first to sixth aspects, the network creation may be carried out if no available network was found at the searching step. Thereby, the network creation can be limited to cases where no network is available yet.

According to an eighth aspect which can be combined with any of the above first to seventh aspects, the ability may comprise at least one of a router, a coordinator, trust centre role, network manager role, gateway role, concentrator role, centralized network creation, centralized network joining, distributed network creation and/or joining, temporary network creation and/or joining, EZ-Mode in target and/or initiator role, touchlink in target role and touchlink in initiator role. This ensures that the wireless node is adapted to be capable of creating at least one type of network.

It is noted that the apparatus may be implemented based on discrete hardware circuitry with discrete hardware components, an integrated chip, or an arrangement of chip modules, or based on a signal processing device or chip controlled by a software routine or program stored in a memory, written on a computer readable medium, or downloaded from a network, such as the Internet.

It shall be understood that the apparatus of claim 1, the method of claim 3, and the computer program of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
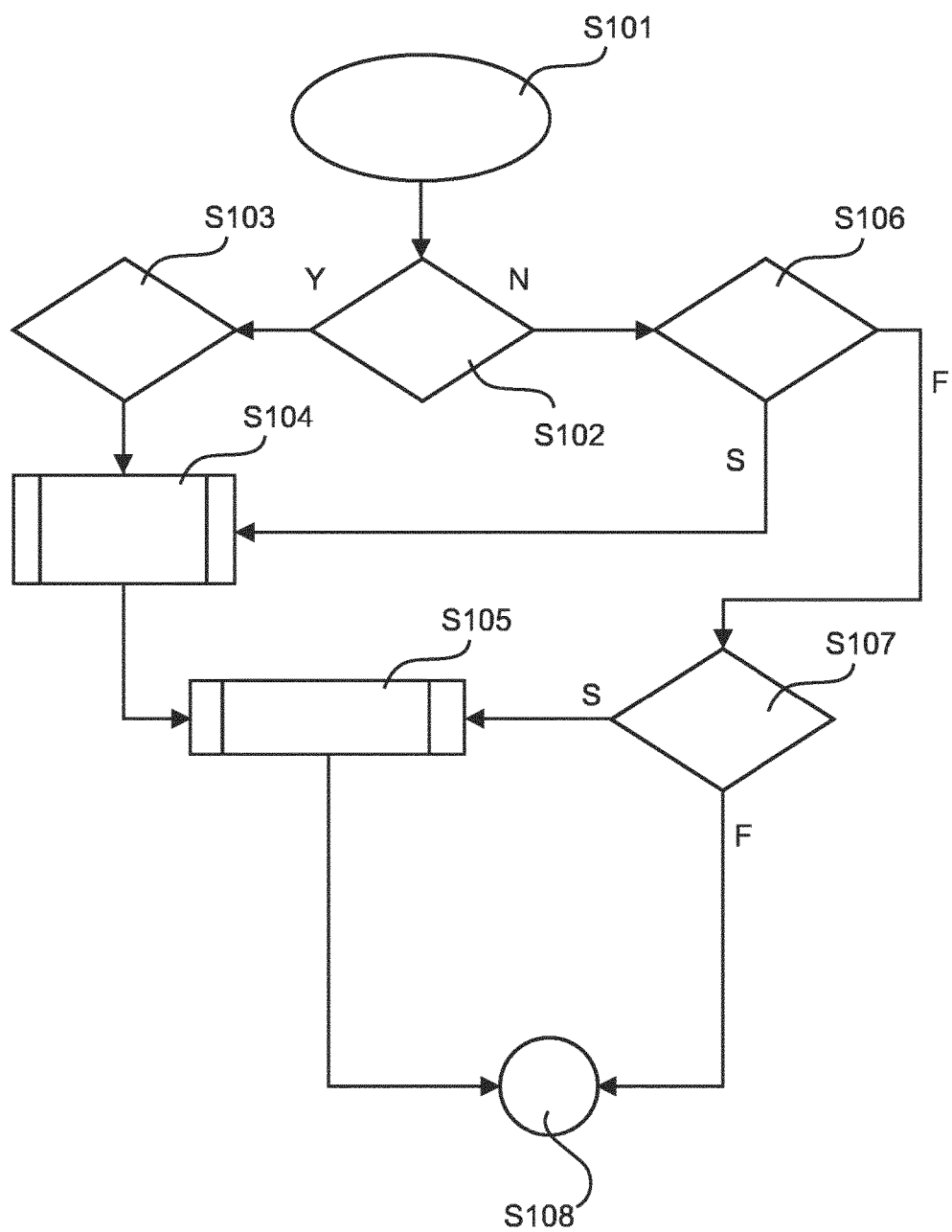
FIGS. 1 and 2 show flow charts representing a conventional method of commissioning for a node.
Figure 2:
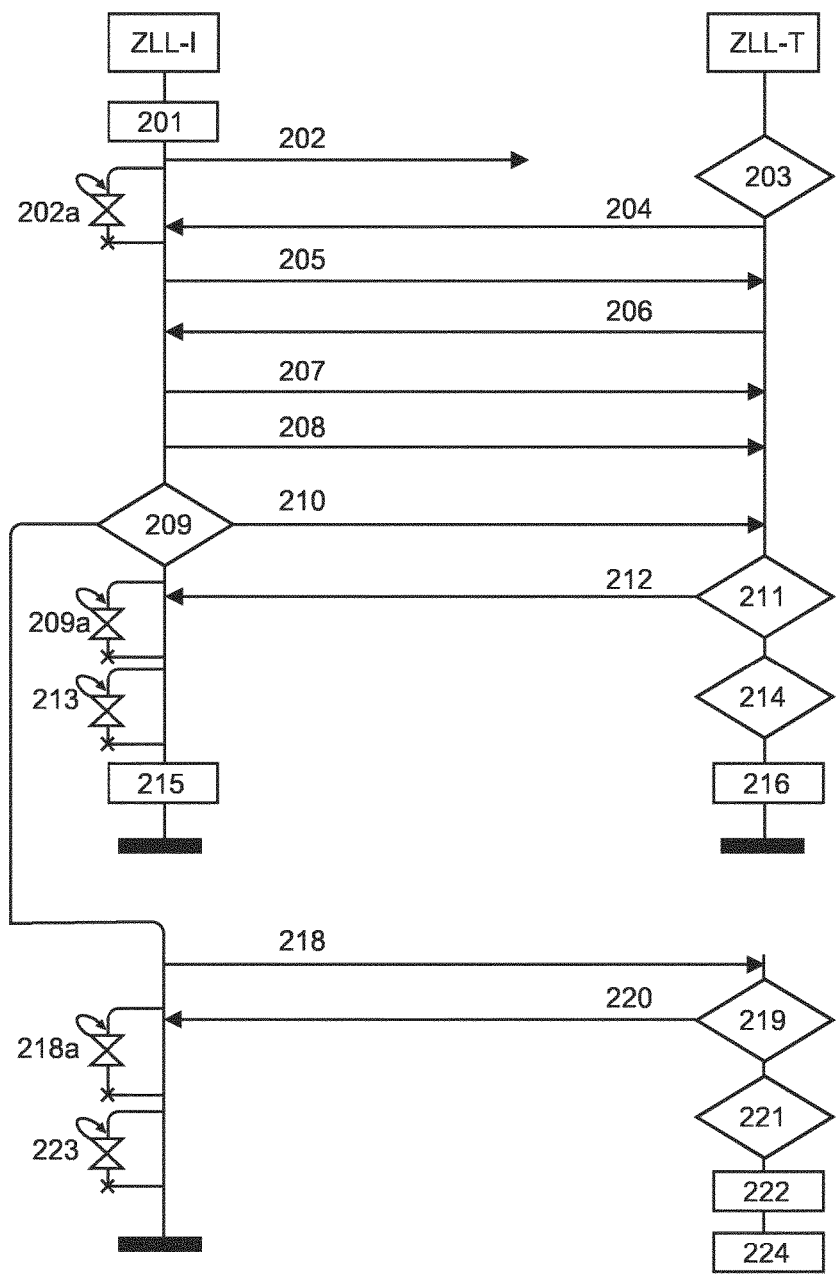

Embodiments of the present invention are now described based on commissioning a wireless sensor network or a home automation network. In particular, the examples introduced and explicated below are based on ZigBee wireless networks. Such networks may be related to home automation networks where several profiles may coexist and need to interact. For example, ZigBee Light Link and ZigBee Home Automation nodes may need to operate together in particular at the formation of a network. It is to be noted that ZigBee networks are used here as an example and the invention could apply to further kinds of wireless networks for home and building automation or sensing or monitoring.

Before proceeding with the description of the embodiments and their respective commissioning procedures, variables that will play a fundamental role in the network inception phase for the ZigBee system are presented and explained. The tables below summarize such variables or parameters, listing first the generic designation of each of the parameters and then its realization in ZigBee systems, including the range of values (in hexadecimal notation) it may assume and its default value (in hexadecimal notation) in a factory-new device. In the first table below, the parameters already defined by the ZigBee specifications are listed.

| Paramter type | ZigBee specific variable | Field name | Data type | Range | Default value |
| --- | --- | --- | --- | --- | --- |
| Node identifier | NA | Network address | unsigned 16-bit address | 0x0000-0xffff | 0xffff |
| Network identifier | PID | PAN identifier | unsigned 16-bit address | 0x0000-0xffff | 0xffff |
| | EPID | Extended PAN identifier | IEEE address | 0x00-0xff [x8] | 0x00 [x8] |
| | NUI | Network update identifier | integer | 0x00-0xFF | 0x00 |
| Radio channel | LC | Logical channel | unsigned 8-bit integer | 0-26 | 0x00 |
| Security settings | SNK | Security network key | set of 0, 1 or 2 network security material descriptors | Variable | — |
| | SNKID | Key identifier | unsigned 8-bit integer | 0x00-0xff | 0x00 |
| | TC | Trust Centre address | IEEE address | 0x00-0xff [x8] | 0x00 [x8] |
| Device commissioning capabilities | CC | Coordinator capable | Boolean | „false"/"true" | As appropriate |
| | LDT | Logical device type | unsigned 8-bit integer | ZC, ZR, ZED | As appropriate |
| Commissioning configuration | PD | Permit duration | unsigned 8-bit integer | 0x00-0xff | 0x00 |

The function of the above parameters is now briefly explained:
The network address (NA) field is 16-bits in length and shall contain the short network address assigned to a wireless node/controller.
The Personal Area Network (PAN) identifier field (PID) is 16-bits in length and shall contain the identifier of a PAN.
The extended PAN identifier (EPID) field is 64-bits in length and shall contain the extended PAN identifier of the network.
The logical channel field (LC) (named as "phyCurrentChannel") is 8-bits in length and shall contain the radio channel to be used for the network.

The network update identifier (NUI) field shall contain the value identifying a snapshot of the network settings this node is operating with.

The security network key (SNK) set contains the network keying material, which should be accessible to commissioning applications.

The key identifier (SNKID) contains the sequence number of the active network key in the security network key set.

The coordinator capable (CC) field is a Boolean flag and shall inform about the capability of the device of being able to play the role of a coordinator in the network (i.e. possibility to create a new network, optionally/including acting as a Trust Centre point). If the CC flag is set to true, the device is capable of being a coordinator. If the CC flag is set to false, the device can be a ZigBee router or ZigBee end device type. This flag is named "nwkcCoordinatorCapable" is present in current ZigBee specifications as a Network Information Base (NIB) constant. A second flag (named "apsDesignatedCoordinator") is present in current ZigBee specifications as APS information base (AIB) constant, and it specifies, whether the device shall become a ZigBee Coordinator upon startup. The Alternate PAN Coordinator flag of the MAC (Media Access Control) Capability Flags field of the node descriptor is set to "0b0" by the current ZigBee specification (ZigBee document 053474r20).

The logical device type (LDT) field is 8-bits in length and specifies the type of the device, e.g., if the device is a ZigBee router, a ZigBee coordinator or a ZigBee end device. It is implemented as the Logical Type field of the Node Descriptor.

The permit duration (PD) field is 8-bits in length and specifies the maximum number of seconds the permit join flag will be enabled.

In the second table below, the parameters introduced or modified by at least one of the following embodiments are included. The realization of the parameter (e.g. data type Boolean) is exemplary only; the same effect can be achieved by using other data types (e.g. 8-bit enumeration), and additional conditions can be incorporated. Moreover, the parameters can be merged, e.g. into a bit field or enumeration, as required.

Several of those values can be stored implicitly, i.e. derived from values of other network configuration parameters and/or information stored in the node. E.g., the status encoded in the TEMP field below can be derived by checking the status of both the NWK child and neighbour table and whatever application layer structures are used by ZLL TL mechanism, if any; and if all those tables are empty, concluding the network is in the state TEMP_HOOK. In another example, the temporary network is determined if the TC address is set to "0xff.ff" and/or setting the other network parameters have non-default values, but the configuration status remains FN (e.g. AIN=false).

| Paramter type | ZigBee specific variable | Field name | Data type | Range | Default value |
|---|---|---|---|---|---|
| Device commissioning capabilities | TLS | Touchlink supported | Boolean | „false"/ "true" | As appropriate |
| Device commissioning | AIN | Active in the network | Boolean | „false"/ "true" | „false" |

-continued

| Paramter type | ZigBee specific variable | Field name | Data type | Range | Default value |
|---|---|---|---|---|---|
| status | TS | Touchlink successful | Boolean | „false"/ "true" | „false" |
| | TEMP | Temporary network formed | Boolean | „false"/ "true" | „false" |

The function of the above parameters is now briefly explained:

The active-in-the-network (AIN) field is a Boolean flag and shall specify whether a device has an active participation to a network. If the AIN flag is set to true, the device is intended to be in its normal operational state and connected to a network. If the AIN flag is set to false, the device is not part of an operational network, i.e., did not join or form any network.

The touchlink-supported (TLS) field is a Boolean flag that informs whether the device has the capability to perform touchlinking (i.e. send/receive INTER-PAN frames). This variable is not present in current ZigBee specifications.

The touchlink successful (TS) field is a Boolean flag that informs whether the touchlink procedure has been successful or not. This variable has as default value "false" and it will assume the correct value after the touchlink procedure has been executed. This variable is relevant in later phases for knowing whether the procedure was successful through Touchlink or through association to a network. This flag is not present in current ZigBee specifications.

The temporary network formed (TEMP) field is an enumeration that informs whether the network was formed permanently (e.g. on an explicit user action) or temporarily (e.g. upon scan not detecting any other network or device). It can have e.g. the following values: NO_NETWORK: no network formed; TEMP_HOOK: self-formed network established, no other devices joined; TEMP_NETWORK: self-formed network established, at least one other device successfully joined; PERM_NETWORK: permanent network formed.

For ease of description, the commissioning steps that a device should perform have been diversified in three scenarios, depending on the status and capabilities of the device, covered by respective first to third embodiments of the invention:

commissioning performed by a factory new device;
commissioning performed by a target (e.g. router);
commissioning performed by an initiator.

In connection with the below embodiments, an initiator is understood to be a wireless node which is triggering or starting the first access to a target node. The initiator is able to generate the frames sent to have other devices (e.g. target nodes) join the network.

Each action of the following commissioning procedures depends on the values assumed by at least one of the fields and flags listed above. The following flow charts of the first to third embodiments define logical sequences of steps performed by the devices.

Figure 3:
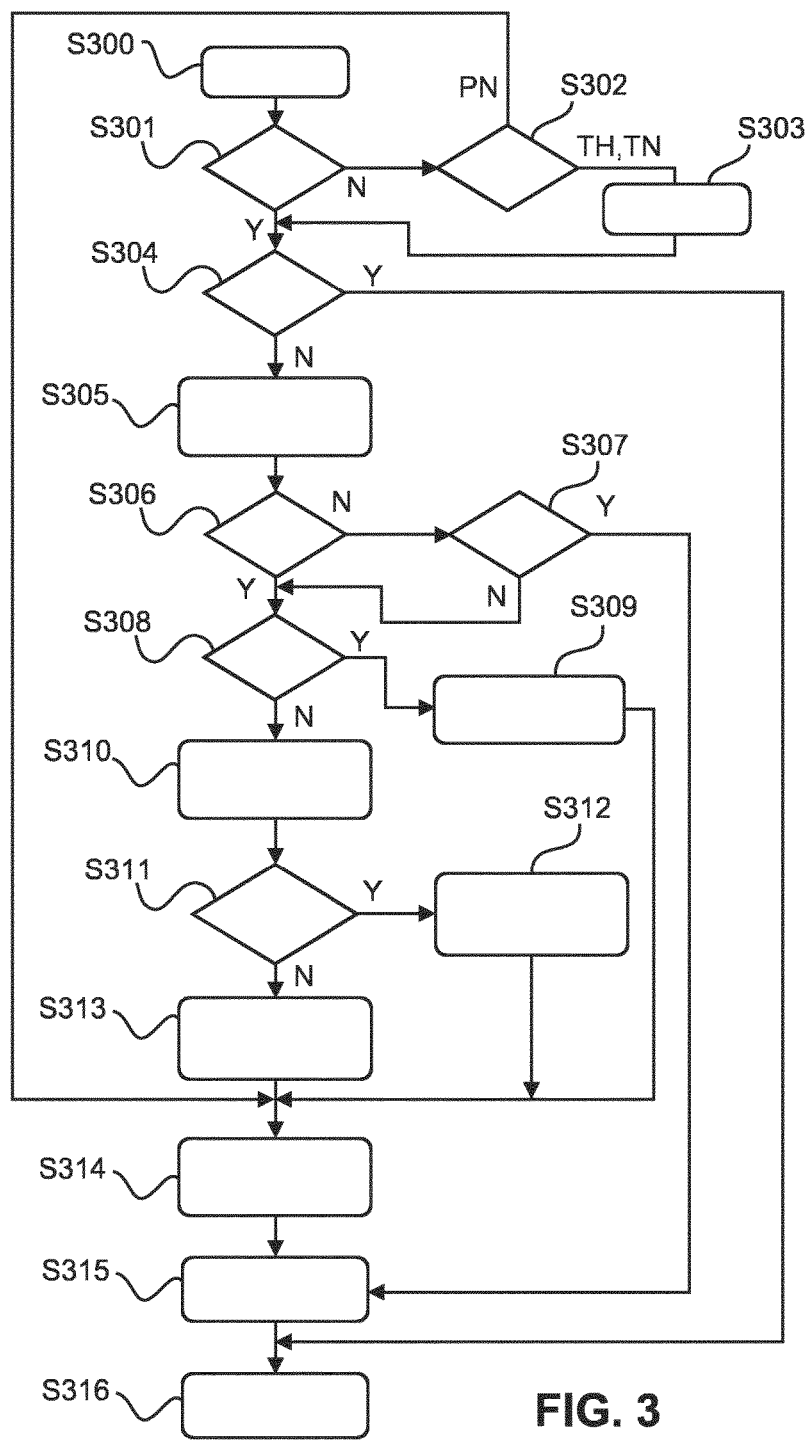
FIG. 3 shows a flowchart of a first embodiment of the invention for the case of power-on of a node.

FIG. 3 shows a flowchart of the first embodiment of the invention for the case of a node not yet operational in the network.

The procedure of FIG. 3 indicates commissioning steps that a device (coordinator, router, end device) performs upon a trigger, e.g. when a factory-new device is powered up for the first time, or when a device is otherwise instructed to perform commissioning, e.g. by a user action, such as e.g. a button push, by timer or on another internal trigger, upon reception of a particular message, or after its status has been reset to new factory conditions. Subsequently, different actions are triggered according to the capabilities of the device.

After the beginning of the procedure at step S300, the status of the device is checked. First, it is checked (e.g. based on the above AIN flag) at step S301, whether the device is in a factory new state. If it is factory new (AIN flag set to "false"), it continues with step S304.

If it is determined at step S301, that the device is not factory new (e.g. AIN flag set to "true"), then, in one embodiment, at step S302, the value of the TEMP parameter is checked. In one implementation, if the TEMP parameter is set to "TEMP_HOOK" (TH), the device shall, and if the TEMP parameter is set to "TEMP_NETWORK" (TN), the device may still continue with step S304, while at the same time allowing for joining (step S303). If the TEMP parameter is set to "PERM_NETWORK" (PN), it jumps directly to step S314. In another implementation, if the TEMP parameter is set to "TEMP_NETWORK" or "PERM_NETWORK" it should proceed to S315 for enabling identify and allowing finding and binding of the device that have already joined the network. In a modification of the first embodiment, it may proceed with the procedure described with reference to FIG. 5. In another modification, the procedure always proceeds to step S314 for enabling joining of possible further devices. In yet another modification, the procedure always proceeds to step S315 for enabling finding and binding of devices.

At step S304, it is checked (e.g. based on the above logical device type field) whether the device is an end device. If so, the procedure jumps to step S316 where the procedure as specified in the first embodiment ends. Thus, when this type of device is powered up, it is not required to perform any steps according to the first embodiment. Based on its application needs, it may perform other actions, e.g. perform a scan, attempt performing another commissioning method, including classical joining, provide user feedback or may remain active or directly enter sleepy sleep mode, e.g., waiting for user action.

If it is determined at step S304 that the device is not an end device and thus a router or a coordinator, at step S305 an active scan is performed. During the active scan a beacon request is broadcast, which is used to determine—for that channel and the hearing range of the radio receiver of the device performing the active scan—what ZigBee or 802.15.4 PAN identifiers (PIDs) are currently in use and what devices are active and what are their capabilities. Optionally, an energy detection scan may be performed first to determine which channels are in use.

At step S306, the results of the scan performed at step S305 are analyzed, and the procedure branches depending on the results of the analysis. If no suitable network for joining is found, the procedure continues with step S307. The "suitable network" can be defined as one fulfilling one or more of the following criteria (i.e. belonging to the following specific range of network types): operational on one of the channels supported by the joining device, allowing for joining (Permit Join flag set to "true"), capable of adding a particular type of device (ZED/ZR), supporting a particular network profile (e.g. ZHA/ZLL), supporting a particular network type (centralized/distributed/temporary), containing a particular device type (coordinator, trust centre, commissioning tool, gateway, concentrator, matching application device, etc.).

If a suitable network for joining is found, the device attempts at step S307 to join the network found. If it is determined at step S307 that the joining was successful, the procedure jumps to step S316 where the procedure according to the first embodiment ends. The device may perform regular ZigBee actions, as defined in the current ZigBee specification. If it is determined at step S307 that the joining fails (which may be due to various reasons, e.g. network at capacity, security key mismatch, network type mismatch, etc.), the procedure continues with step S308.

Then, it is checked at step S308 (e.g. based on the above logical device type field or the coordinator capable (CC) flag) whether the device has the ability to become a coordinator. If it is determined at step S308 that the device has the capability of being a coordinator, the procedure branches to step S309 and the device creates a centralized network as currently described in ZigBee specs and it becomes active in the network. This can be achieved by setting the NA field to "0x0000", the PID field to a unique PID based on the scan, the EPID field to a unique EPID based on the scan (by default "If the NIB attribute "nwkExtendedPANId" is equal to "0x0000000000000000", this attribute will be initialized with the value of the MAC constant "macExtendedAddress", i.e. to device's own IEEE address, as indicated in ZigBee specification r20, sec. 3.2.2.3.3, page 303, line 22-25), the LC field to the best channel derived from the scan and the AIN field to "true". In a modification, if TEMP field was set to TEMP_HOOK, the previously selected network settings can still be used. Optionally, an energy detection scan may be performed first to determine which channels are in use, especially if this was omitted at step S305. If the device has the capability of being a Trust Centre for the network, the TC parameter is set to the IEEE address of the device itself and security settings are generated and set. In an embodiment modification, the TEMP field is set to TEMP_HOOK, indicating that the centralized network was self-formed in the absence of any suitable network to join, rather than on explicit user request.

In case it is determined at step S308 that the device does not have the capability of being a coordinator of a network, it prepares itself at step S310 for the creation of a distributed network by setting the NA field to a random value not equal to "0x0000" or "0xffff", the TC field to "0xffffffffffffffff", the PID field to a unique PID based on the scan, and the EPID field to a unique EPID based on the scan. Additionally, the security settings are generated and set. In a modification, if TEMP field was set to TEMP_HOOK, the previously selected network settings can still be used.

At step S311 the commissioning procedure again takes two different directions depending on a checking result (e.g. based on the above TLS field) as to whether the device has the ability to support touchlinking or was not configured for such a support.

If it is determined in step S311 that the device can be configured for a touchlink capability, in step S312 it will select one (e.g. the best channel derived from the scan) of the primary ZLL channels (i.e. 11, 15, 20, 25 out of the 16 available 802.15.4 channels at 2.4 GHz), set the LC field to this value and the AIN field to "true". Optionally, an energy detection scan may be performed first to determine which channels are in use, especially if this was omitted at step S305. In one of the modifications, the TEMP field is set to TEMP_HOOK, indicating that the distributed network was self-formed in the absence of any suitable network to join.

If it is determined in step S311 that Touchlink is not supported, then at step S313 the device will select one out of the 16 available 802.15.4 channels at 2.4 GHz, (e.g. the best channel derived from the scan), set the LC field to this value and the AIN field to "true". Optionally, an energy detection scan may be performed first to determine which channels are in use, especially if this was omitted at step S305. In one of the modifications, the TEMP field is set to TEMP_HOOK, indicating that the distributed network was self-formed in the absence of any suitable network to join.

At step S314, it will enable joining by setting the Permit Join parameter for permit duration. The PD field value can be adapted to control the time window during which devices can join the network (e.g. PD=0x64 which corresponds to 180 s). Then, it will wait for input, e.g. joining attempts of other nodes, at step S315. In one of the embodiments, if any devices successfully join the network at step S315, the TEMP field is set to TEMP_NETWORK. If the device joins using touchlinking, the TS flag is set to TRUE. Furthermore, as part of step S3315 or as a separate step, finding and binding and other configuration actions can be performed. Then the procedure ends in step S316.

Figure 4:
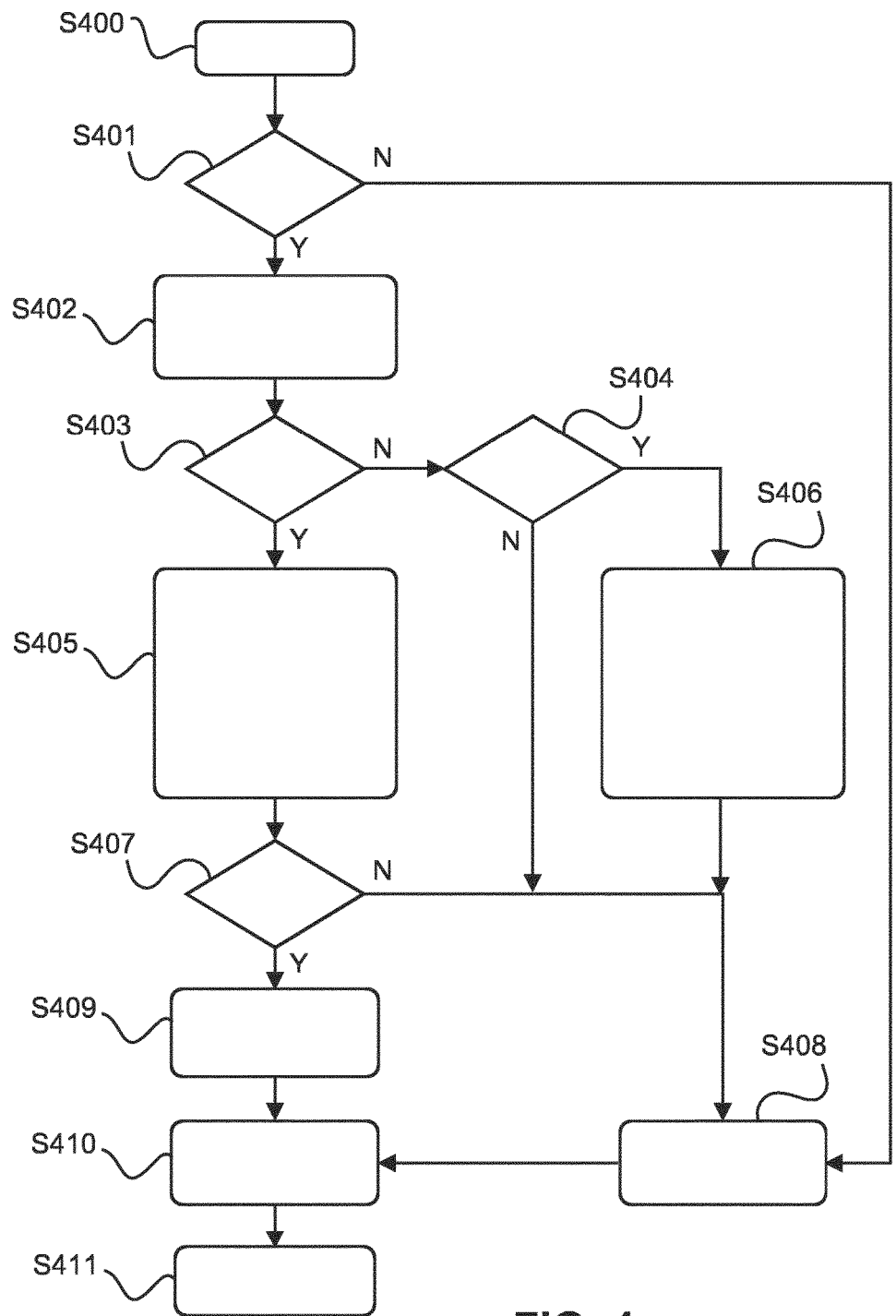
FIG. 4 shows a flowchart of a second embodiment of the invention for the case of a target router searching a network.

FIG. 4 shows a flowchart of a second embodiment of the invention for the case where a target router is searching a network, i.e. target procedure of finding networks. Thus, the commissioning steps of FIG. 4 are performed by a target device for discovering and joining a network.

The procedure begins at step S400. At step S401 it is checked whether the device has the AIN flag set to "false". If not, the procedure jumps to step S408 where the Permit Join flag is set to "true" for the permit duration of 3 min (i.e. PD field is set to "0x64"). Then, at step S410, a finding and binding procedure may start.

In case it is determined in step S401 that the AIN filed is set to "false" and thus the device is not active in the network, step S402 is performed, which corresponds to step S302 of FIG. 3. Then it is checked in step S403 whether an open network has been found during the scanning process. If the scanning at step S402 reveals the presence of (an) open network(s), the procedure proceeds to step S405 and the device attempts a joining procedure and associates to a detected network by setting the NA field to a new address, the PID field to a new PID, the EPID field to a new EPID, the LC field to a new channel and the AIN field to "true". Furthermore, the PD field can be set to 3 min, which is a value equal to the recommended EZModeTime according to the ZigBee Home Automation specifications.

Then it is checked at step S407 whether a MAC association of the device to the discovered network has been successful. If so, security key information is exchanged in step S409 and the finding and binding procedure may be performed in step S410, before the procedure ends in step S411.

If it is determined at step S403 that the scanning process in step S402 did not reveal the presence of any open network, it is checked in step S404 whether the CC flag is set to "true", i.e., whether the device has a coordinator capability. If so, the procedure branches to step S406 and a network is created by setting the PID field to a unique PID based on the scan, the EPID field to a unique EPID based on the scan, the LC field to the best channel derived from the scan, and the AIN field to "true". Then, the procedure proceeds with step S408 and enables joining by setting the Permit Join parameter to "true" for the permit duration of 3 min (i.e. PD filed is set to "0x64"). Finally, the finding and binding procedure of step S410 is performed and the procedure ends at step S411.

On the other hand, in case it is determined at step S404 that the device does not have the capability of playing the role of coordinator (i.e. CC field set to "false"), no network is created and the procedure directly proceeds to step S408 where the permit duration is set to 3 min (i.e. 180 s). The same action is performed in case the association is determined to have been not successful in step S407.

Figure 5:
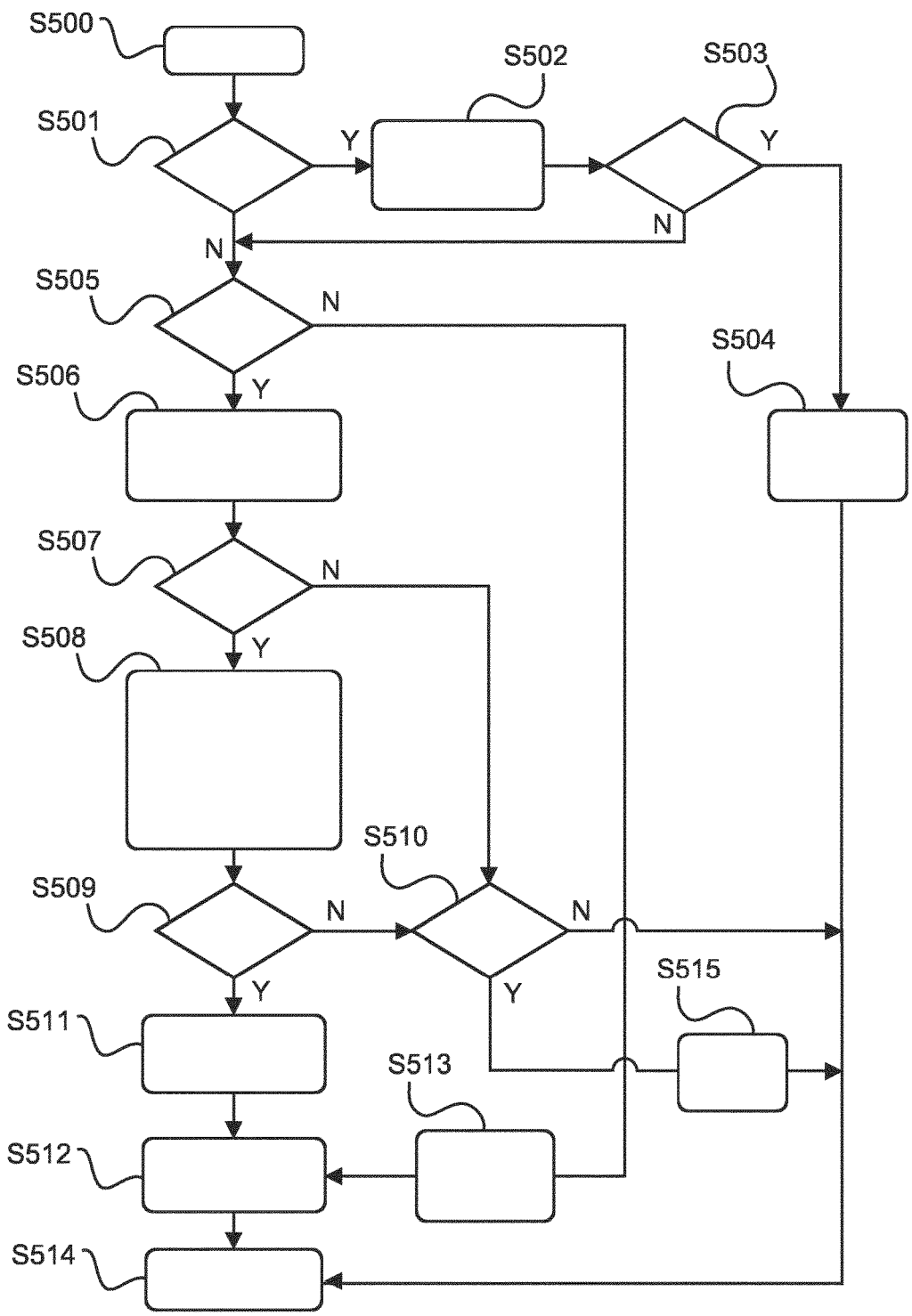
FIG. 5 shows a flowchart of a third embodiment of the invention for the case of an initiator node searching a network.

FIG. 5 shows a flowchart of a third embodiment of the invention for the case of an initiator node or device searching a network, i.e., initiator procedure for finding networks. This procedure describes steps of an initiator device to enter in its normal operational state.

The procedure begins at step S500. Then, at step S501 it is checked whether the device supports touchlink. If so, the device attempts at step S502 to start a touchlink procedure in the initiator role. If it is determined at subsequent step S503 that the touchlink procedure was successful, the TS and AIN flags are set to "true" at step S504. Thereby, a network is created, which is of a distributed type. Then, the procedure ends at step S514.

If it is determined in step S501 that the device does not support the touchlink procedure or it is determined in step S503 that the attempt of touchlinking has failed, the procedure continues at step S505 where the value of the flag AIN is checked. If it is determined at step S505 that the AIN flag is set to "true", the procedure branches to step S513 where the device if a router sets its permit join to true, and optionally broadcasts a primitive Mgmt_permit_joining with PD parameter equal to 180 s. Then, a finding and binding procedure is started at step S512. As for the first embodiment, the behavior can differ further, depending on the settings of the TEMP variable.

If it is determined at step S505 that the AIN flag is set to "false", the device performs at step S506 an active scan (similar to step S302 of FIG. 3 and S402 of FIG. 4) in order to find a suitable network to associate to.

Then it is checked at step S507 whether a suitable network has been found. The definition of a suitable network is given in step S306, in reference to FIG. 3. If so, e.g. if the result of the scan returns a network with a Permit Join flag set to "true", the device tries to join the network via MAC association at step S508.

Then it is checked at step S509 whether a MAC association of the device to the discovered network has been successful. If so, the device sets the network configuration parameters obtained during association (e.g. channel, PANID, EPID), security key information is exchanged and the AIN field to "true", so that the device becomes active in the network in step S511 and the finding and binding procedure may be started at step S512 (e.g. by enabling identifying and/or sending the discovery commands), before the procedure ends in step S514.

If it is determined at step S509 that the MAC association has failed or if it is determined at step S507 that no suitable network has been found, then at step S510 it is determined if the device has network creation capability (e.g. based on the logical device type or CC). If not, the procedure of the third embodiment ends at step S514. Based on its application needs, the device may perform other actions, e.g. attempt performing another commissioning method, provide user feedback or may remain active or directly enter the sleepy mode, e.g. waiting for user action. If the device has network creation capability, the device will create a network at step S515 (as described in steps S304-

S310 of the first embodiment). This may be preceded by energy detection scan. Then, the procedure of the third embodiments ends at step S514.

In reference to the procedures described above, the following is noted.

Current specifications for Light Link devices define a recommended minimum time of 60 s for joining a network, while according to the EZ-Mode the permit duration should be set to 180 s. In order to fill this current gap and allow interoperability, it is proposed in the commissioning procedures of embodiments of the present invention that each device that wishes to allow other devices to join a network sets its permit duration to 180 s.

In a similar way, in order to establish a relationship between devices and their controlling applications (i.e. binding), devices may broadcast the identify query command (identify cluster) and may set the Identify Time attribute in the Identify cluster equal to 180 s.

Figure 6:
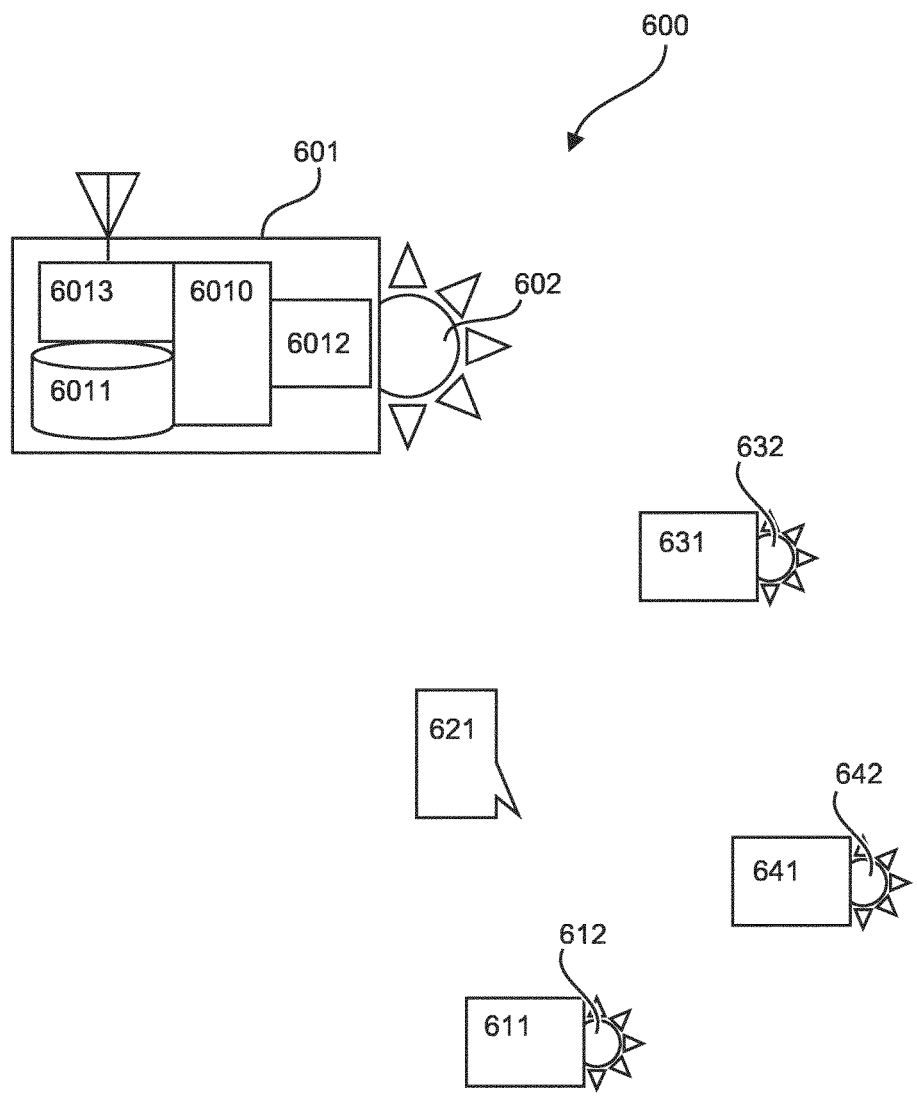
FIG. 6 shows a block diagram of a network architecture according to a fourth embodiment in which embodiments can be implemented.

FIG. 6 shows a block diagram of a network architecture according to a fourth embodiment in which the above first to third embodiments can be implemented.

As shown in FIG. 6, the above first to third embodiments may operate on a wireless network 600 being in formation. In this wireless network 600, a node 601 may be attached to another device that the node 601 can control, for example a luminaire 602 or other lighting device.

For the purpose of illustration, the node 601 is represented in FIG. 6 in a detailed way, hence the relative large size of its representation compared to other nodes. It is to be noted that the other nodes 611, 631 and 641 with their controlled luminaires 612, 632 and 642 may be structurally identical to the node 601.

Moreover, the nodes of FIG. 6 may be linked to different kinds of devices, other than luminaires. For example, node 621 may be a switch that may be used to wirelessly control other nodes. Although not represented these nodes may also be other actuators, like climate control panels, heating, ventilation and air conditioning (HVAC) devices, meters, sensors, or any other home or building automation devices.

The node 601 comprises a controller 6010 coupled to a memory 6011 which may store for example a software specifying the behavior of the node 601 in accordance with at least one of the procedures of FIGS. 3 to 5. The controller 6010 may also be coupled to a driver 6012 which generates the commands to the luminaire 602 and to a transceiver 6013 which will ensure wireless communications with the rest of the future network 600. Energy may be supplied to the node by means of a battery (not shown) or through the mains, or an energy harvester (solar panels, user actuated switch, etc.).

As described in connection with other embodiments, the controller 6010 of the node 601 may behave differently depending on the considered scenario. On power-up of the node 601, the controller 6010 of the node 601 will initiate an active scan to check the occupancy status of the channels in the area or to check whether there is a neighboring network to join to. The active scan is operated by the transceiver 6013 of the wireless node 601.

Further action depends on the device's CC capability. The controller 6010 can check in the memory 6012 whether the node 601 has the ability to be a coordinator or a router. Alternatively, the node 601 can immediately run the procedure corresponding to its capabilities. In case the node 601 is able to be a coordinator, the controller 6010 will start creating a network which topology is a consequence of this ability. Here, since the node 601 is a coordinator, the topology of a centralized network will be selected, giving the authority on the network 600 to the node 601. Then, any joining nodes in the vicinity will be able to join the created network, simplifying the process of commissioning.

According to the above embodiments, a device or node can attempt all possible ways by means of its abilities to create a network or join and establish control relationship with any other device in the vicinity. To achieve that, if no available network is detected, the node will take the responsibility of creating the network even if the node was not configured to (but has the ability). The created network will then have properties that are the consequence of the ability of its initiator. For example, a coordinator node will create a centralized network, while a router node without a coordinator capability will create a distributed network.

According to the above embodiments, two scenarios for the coordinator behavior are proposed, namely a coordinator as intended in current ZigBee specifications, which always creates a network when factory-new or upon power-up if no previous network configuration is stored, and a coordinator with the ability to join a centralized or distributed network in case it detects any. As a direct consequence, the CC flag has a different meaning in these two cases (or alternatively, for the second case, another flag (e.g. for force forming) could be added).

In the above first case of a conventional coordinator behavior, when factory-new or upon power-up if no previous network configuration is stored, if the CC flag is set to "true", it forces the device to create a network. The device performs a scan just to check the uniqueness of the parameters of the network chosen. However, there is no attempt to look for other network or joining them.

In the above second case of a coordinator with extra ability, when factory-new or upon power-up if no previous network configuration is stored, if the CC flag is set to "true" (or optionally if the alternative flag is set to "false"), the device first scans for any suitable network; the definition of the term suitable network is given at step S306 of FIG. 3. If any suitable network is detected, the coordinator attempts to associate to the network. The CC flag set to "true" allows the device to create a network only in case no network had been detected or association to other networks fails (or if the alternative flag is set to "true"). If the CC flag is set to "false" (or optionally if the alternative flag is set to "true"), it forces the device to create a network.

The network created by a router is intended to be a "temporary" network until a second device has performed a successful joining procedure. If no device attempts to join before the permit duration expires, the router may remain in the temporary network state or may perform a new scan for available network to join and, upon successful scan, it may try to join the network detected.

Additionally, for factory-new devices it is may not be needed to check whether the AIN flag is set to "true", since its default value has been define as "false". For all other different cases it is necessary to check the value of the AIN flag at the beginning of the procedure, in order to identify whether the device has already joined or created a network.

Moreover, a factory-new/non-factory-new distinction could be embedded in the AIN checking steps of the second and third embodiments at the beginning of respective flow diagrams of FIGS. 4 and 5, while a distinction as to initiator or target could be applied only for devices supporting the touchlink procedure.

In addition, it is noted that although a factory-new device has necessarily the AIN flag set to "false", a NFN device may not have necessarily the AIN flag set to "true". The status of AIN flag changes upon accomplishment of the authentication phase or creation of the network. However, there are also situations like device leaving a network or having become an orphan node. To accommodate for that, several solutions are possible. For one, the AIN flag could be interpreted as "having a valid network configuration", which is consistent with the current first embodiment. In such a case, an orphaned node will not change the status of the AIN flag. Alternatively, the AIN flag could be interpreted as "able to communicate in the network", i.e. could be reset to "false" e.g. on parent loss/leaving and eventually reset to "true" once a new join/rejoin has been successfully performed. In such a case, the device would have to determine the commissioning action based not only on the state of the AIN flag, but also on the value of other network parameters stored. In another embodiment yet, additional values could be added to the AIN parameter, to express this, e.g. "factory-new", "no network connection", "active in the network" or the like.

Additionally, the value of the TEMP parameter can further influence the commissioning behaviour of a device, e.g. also when performing touchlinking. For example, if the ZLL target has the TEMP field set to TEMP_NETWORK, and the network is distributed, and the ZLL initiator it is performing touchlinking with is factory new, then the ZLL target may decide to pull the initiator into its network, rather than allowing the initiator to create new network settings. This could e.g. be accomplished by setting: in the InterPAN touchlink exchange, the ZLL initiator sub-field of the ZLL information field of the Scan request/response command of the ZLL commissioning cluster to "0b1" and the Factory new sub-field of the ZLL information field of the Scan request command of the ZLL commissioning cluster to "0b1"; and by transmitting the self-established network configuration in the respective fields of the Network join end device command frame of the ZLL commissioning cluster; or in the InterPAN touchlink exchange, the ZLL initiator sub-field of the ZLL information field of the Scan response command of the ZLL commissioning cluster to "0b0" and the Factory new sub-field of the ZLL information field of the Scan request command of the ZLL commissioning cluster to "0b1"; and by transmitting the self-established network configuration in the respective fields of the Network start response command frame of the ZLL commissioning cluster. In another example, if the ZLL target has the TEMP field set to TEMP_NETWORK, and the network is distributed, and the ZLL initiator it is performing touchlinking with is not factory-new, then the ZLL target may decide to join the initiator's network, but after attempting the devices o its TEMP_NETWORK network, which can e.g. be accomplished by sending Network update request command of the ZLL commissioning cluster over the self-established ZigBee network.

The temporary, self-formed network could also be made recognizable to the candidate joiners, by setting one of the network parameters transmitted in the ZigBee payload of the 802.15.4 MAC Beacon, e.g. the EPID, to a predefined value. (same mechanism is used to identify the CT-based commissioning networks, the EPID used there: 00-50-c2-77-10-00-00-00; the other EPID values in this range (00-50-c2-77-10-00-00-01-00-ff-ff are reserved for other commissioning use).

The distributed character of the (home) network could be made recognizable to the candidate joiners, by setting one of the "device depth" parameter transmitted in the ZigBee payload of the 802.15.4 MAC Beacon, to a predefined value, e.g. 0xf. The "device depth" has no meaning in a distributed network, since there is no central device to be used as a root, and this value (indicating 15 hops) is unlikely to be often seen in centralized home networks.

Moreover, there may be other triggers on the device, allowing it to jump directly to a particular procedure step (e.g. network formation, finding and binding).

To summarize, a wireless node and a method of operating the wireless node have been described, wherein the wireless node comprises a controller arranged for communicating wirelessly with at least one further wireless node so as to determine an ability of the wireless node and to create a network, wherein a characteristic of the network depends on the determined ability of the wireless node.

The described operations of the components of the network system according to various embodiments can be implemented as program code means of a computer program and/or as dedicated hardware. More specifically, the described procedures like those indicated in FIGS. 3 to 5 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

While the invention has been illustrated and described in detail in the drawings and foregoing description, such illustration and description are to be considered illustrative or exemplary and not restrictive. The invention is not limited to the disclosed embodiment with the lamps or luminaires as load devices. It can be implemented in connection with any type loads, sensors, switches and the like.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The invention claimed is:

1. An apparatus for a wireless node, said apparatus comprising a controller for communicating wirelessly with at least one further wireless node, said controller being adapted to determine an ability of the wireless node and to configure said wireless node to create a network, wherein a characteristic of the network depends on the determined ability of the wireless node; and wherein said controller is further adapted to determine whether the wireless node has network forming capabilities and of what kind, to detect whether at least one further node of a specific kind is in the vicinity of the wireless node and to create a distributed network if the wireless node is determined to be a router device and if no further node of the specific kind is detected in the vicinity of the wireless node or to create a centralized network if the wireless node is determined to have coordinator capabilities and if no further node of the specific kind is detected in the vicinity of the wireless node.

2. The apparatus according to claim 1, wherein said controller is further adapted to determine whether the wireless node has network forming capabilities and of what kind, to detect whether at least one further node of a specific kind is in the vicinity of the wireless node and to create a distributed network if the wireless node is determined to be a router device and if no further node of the specific kind is detected in the vicinity of the wireless node or to create a centralized network if the wireless node is determined to have coordinator capabilities and if no further node of the specific kind is detected in the vicinity of the wireless node.

3. A method for operating a wireless node, said method comprising the steps of:
  (a) making available to a controller of the wireless node an ability of the wireless node; and
  (b) configuring by the controller the wireless node to create a network, wherein a characteristic of the network depends on the determined ability of the wireless node,
  wherein said controller is further adapted to determine whether the wireless node has network forming capabilities and of what kind, to detect whether at least one further node of a specific kind is in the vicinity of the wireless node and to create a distributed network if the wireless node is determined to be a router device and if no further node of the specific kind is detected in the vicinity of the wireless node or to create a centralized network if the wireless node is determined to have coordinator capabilities and if no further node of the specific kind is detected in the vicinity of the wireless node.

4. The method of claim 3, further comprising the step of searching for a predetermined range of network types, and wherein the ability of the wireless node is determined by the controller if no network of the predetermined range or only a predetermined type of network is found.

5. The method of claim 3, wherein in the creating step the characteristic of the network is that the network is of a centralized topology if the controller determines that the wireless node is able to be a coordinator, and wherein the wireless node becomes the coordinator of the centralized network.

6. The method of claim 3, wherein in the creating step the characteristic of the network is that the network is of a distributed topology if the controller determines that the wireless node has distributed network formation capability.

7. The method of claim 3, wherein the controller determines whether the wireless node is able to operate according to a specific commissioning procedure, and wherein in the creating step, the created network is a distributed network of a first profile if the wireless node is able to operate according to the specific commissioning procedure.

8. The method of claim 7, wherein the specific commissioning procedure is touchlink and wherein the first profile is ZigBee Light Link.

9. The method of claim 3, wherein said method further comprises searching by the controller for a suitable network, determining by the controller an ability of the wireless node, and creating by the controller a network depending on the determined ability of the wireless node, wherein said suitable network is a network operational on one of the channels supported by a joining device, allowing for joining, capable of adding a particular type of device, supporting a particular network profile, supporting a particular network type, or containing a particular device type.

10. The method of claim 9, wherein the creating step comprises creating a centralized network and controlling the wireless node to act as a coordinator of the centralized network.

11. The method of claim 9, wherein the ability comprises at least one of a router, a coordinator, a trust centre role, a network manager role, a gateway role, a concentrator role, creation of centralized network, joining of centralized network, creation of distributed network, joining of distributed network, creation of temporary network, joining of temporary network, EZ-mode commissioning in target role, EZ-mode commissioning in initiator role, touchlink in target role and touchlink in initiator role.

12. The method according to claim 3, further comprising if a device self-forms a temporary network, then when performing commissioning again, it may join another network, or if a touchlink is performed on a temporary network, the temporary network consisting of more than one device, a factory new initiator may be instructed to join the temporary network rather than form a new network.

13. The method of claim 12, wherein the at least one further node of the specific kind is a coordinator node, a trust centre role, a network manager role, a gateway role, a concentrator role, an application device with specific application functionality, or an ZLL initiator node.

14. The method according to claim 3, further comprising the steps of determining whether the wireless node is a router device, detecting whether at least one further node of a specific kind is in the vicinity of the wireless node, and creating a distributed network if the wireless node is determined to be the router device and if no further node of the specific kind is detected in the vicinity of the wireless node.

15. A non-transitory computer readable medium containing program instructions for operating a wireless node, the program instructions, when executed on one or more processors, causing the one or more processors to carry out the steps of:
  (a) making available to a controller of the wireless node, an ability of the wireless node; and
  (b) configuring, by the controller, the wireless node to create a network, wherein a characteristic of the network depends on the determined ability of the wireless node,
  wherein said controller is further adapted to determine whether the wireless node has network forming capabilities and of what kind, to detect whether at least one further node of a specific kind is in the vicinity of the wireless node and to create a distributed network if the wireless node is determined to be a router device and if no further node of the specific kind is detected in the vicinity of the wireless node or to create a centralized network if the wireless node is determined to have coordinator capabilities and if no further node of the specific kind is detected in the vicinity of the wireless node.

* * * * *